United States Patent Office 3,133,059
Patented May 12, 1964

3,133,059
COPPER AND NICKEL PHTHALOCYANINE DYE-STUFFS HAVING A MONO- AND DI-HALO-SUBSTITUTED TRIAZINE RING
Peter Frederick Clark, Harold Thompson Howard, and James Wardleworth, Manchester, England, assignors to Imperial Chemical Industries Limited, London, England, a corporation of Great Britain
No Drawing. Filed Mar. 2, 1962, Ser. No. 176,913
Claims priority, application Great Britain Mar. 14, 1956
3 Claims. (Cl. 260—242)

This invention relates to new phthalocyanine compounds. More particularly the invention relates to new water-soluble phthalocyanine compounds having commercial utility as dyestuffs.

The application is a continuation-in-part of copending applications Serial Nos. 644,969, filed March 11, 1957, and 752,399, filed August 1, 1958, both now abandoned, the disclosures of which are incorporated herein by reference.

A large number of water-soluble phthalocyanine dyestuffs have been described in the past. Such dyestuffs have been proposed for use as direct dyestuffs for the colouration of cellulose material, but suffer from the disadvantage that they do not have good affinity for such materials. Hence it is difficult to obtain strong shades, and the dyed material has poor fastness to washing, even a rinse in water being sufficient in many cases to wash large quantities of the dyestuff from the material.

We have now discovered a class of phthalocyanine compounds which can be used to dye cellulose materials in shades fast to severe washing treatments.

According to the invention there are provided the new phthalocyanine compounds of the formula:

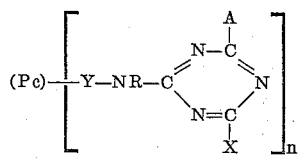

wherein (Pc) stands for a phthalocyanine radical, Y stands for a direct link or for a divalent bridging radical and the system (Pc)—Y— contains at least one solubilising group, R stands for hydrogen, alkyl, aralkyl or cycloalkyl, X stands for a halogen atom, preferably chlorine, A stands for a halogen atom, preferably chlorine, or a hydrocarbon radical or substituted hydrocarbon radical attached through an oxygen or sulfur atom and $n$ stands for a whole number, preferably 1 or 2.

The phthalocyanine radical may be metal-free or may be the radical of a stable metal phthalocyanine, for example nickel or cobalt but preferably copper phthalocyanine.

The benz-rings of the phthalocyanine radical may be substituted further for example by halogen such as chlorine and bromine, aryl groups such as phenyl or they may form part of a polynuclear system, for example a naphthalene system.

There may also be present groups of the kind

—Y—NHR$_1$ where R$_1$ stands for hydrogen, alkyl, aralkyl, cycloalkyl and acyl.

As examples of divalent bridging radicals which are represented by Y in the above formula, there may be mentioned -phenylene-, —CO-phenylene-, —SO$_2$-phenylene-, —NH-phenylene-, —CH$_2$O-phenylene-, —CH$_2$-phenylene-, —SCH$_2$-phenylene, —SO$_2$CH$_2$-phenylene-, —SO$_2$NR′-phenylene-CH$_2$—, —SO$_2$NR′-arylene-, —NR′CO-phenylene-, NR′SO$_2$-phenylene-, —SO$_2$O-phenylene-, —CH$_2$—, —CH$_2$NR′-phenylene-, —CH$_2$—NH.CO-phenylene-, —SO$_2$NR′-alkylene-, CH$_2$NR′-alkylene-, —CONR′-phenylene-CH$_2$—, —CONR′-arylene-, —SO$_2$—, and —CO—. In the above divalent bridging radicals, R′- stands for hydrogen, alkyl or cycloalkyl, arylene stands for an aromatic divalent bridging radical wherein the terminal valence bonds may be attached to the same or different nuclei, and alkylene stands for an aliphatic divalent radical which may include hetero-atoms such as nitrogen as well as carbon in the chain of atoms, for example it may stand for the radical

—CH$_2$CH$_2$—NH—CH$_2$CH$_2$— and the phenylene groups may be substituted, for example by halogen, alkyl and alkoxy.

As examples of aromatic divalent bridging radicals denoted by arylene there may be mentioned aromatic nuclei, for example a benzene nucleus, a naphthalene nucleus, an acridine nucleus and a carbazole nucleus, said nuclei may bear further substituents, such as chlorine atoms or methyl or sulfonic acid groups and dicyclic radicals of the benzene series such as those of the formula:

wherein the benzene rings may bear further substituents of the same type, and wherein —D— stands for a bridging group, for example —CH=CH—, —NH—, —S—, —O—, —SO$_2$—, —NO=N—, —N=N—, —NH.CO.NH—, —CO.NH—, —O.CH$_2$CH$_2$O— and

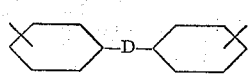

In addition to the above, the grouping —Y—NR— can represent the sulfonpiperazide radical

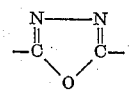

As examples of solubilising groups present in the new phthalocyanine compounds there may be mentioned sulfonic acid and carboxylic acid groups.

As examples of the groups represented by A there may be mentioned lower alkoxy and substituted lower alkoxy groups such as methoxy, ethoxy, n-propoxy, iso-propoxy, n-butoxy, β-chloroethoxy, β-methoxyethoxy and β-ethoxy-ethoxy, aryloxy groups such as phenoxy, naphthoxy, p-tolyloxy, p-sulphophenoxy, p-chlorophenoxy, p-carboxyphenoxy and 2′-nitro-4′-sulfophenoxy, lower alkylthio and substituted lower alkylthio groups such as methylthio, ethylthio, β-hydroxyethylthio, β-carboxyethylthio, carboxymethylthio and benzylthio, and arylthio groups such as phenylthio, chlorophenylthio, nitrophenylthio, m-sulfophenylthio and methylphenylthio. The new phthalocyanine compounds of Formula I can be obtained by interacting an amino-phthalocyanine compound of the formula (Pc)—(Y—NHR)$_n$ with a triazine of the formula:

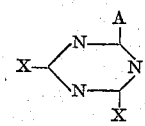

wherein (Pc), X, Y, R, $n$ and A each have the significance given above.

As examples of triazines which may be used in the above process there may be mentioned cyanuric chloride, cyanuric bromide, 2-methoxy-4:6-dichloro-s-triazine, 2-p-chlorophenoxy-4,6-dichloro-s-triazine, 2 - p - methylphenoxy-4,6-dichloro-s-triazine, 2-phenylthio-4:6-dichloro-s-triazine, 2-p-methyl-phenylthio-4:6-dichloro-s-triazine, 2-phenoxy-4:6-dichloro-s-triazine, 2-p-nitrophenylthio-4:6-dichloro-s-triazine, 2-p-chlorophenylthio-4:6-dichloro-s-triazine, 2-m-sulfophenylthio-4:6-dichloro-s-triazine, 2-methylthio-4:6-dichloro-s-triazine, 2-β-hydroxyethylthio-4:6-dichloro-s-triazine, 2-β-chloroethoxy-4:6-dichloro-s-triazine and 2-ethylthio-4:6-dichloro-s-triazine.

Those of the new dyestuffs in which A stands for a hydrocarbon or substituted hydrocarbon group linked through an oxygen or sulfur atom may also be obtained from those in which A stands for chlorine or bromine by reaction with one molecular proportion for each triazine ring in the compound, of an aliphatic or aromatic hydroxyl or mercapto compound in the presence of an acid-binding agent.

As examples of suitable amino-phthalocyanine compounds which may be used in the above process there may be mentioned copper phthalocyanine-4-N-(4-amino-3-sulfophenyl-)sulfonamide-4′:4″:4‴-trisulfonic acid, cobalt phthalocyanine-4:4′-di-N-(3′-amino-4′-sulfophenyl)-carbonamide-4″:4‴-dicarboxylic acid and copper-4-(4′-amino-3′-sulfobenzoyl)-phthalocyanine.

There may also be used mixtures of aminophthalocyanines, for example there may be used a mixture of approximately equal parts of copper phthalocyanine-N-(4-amino-3-sulfophenyl-)sulfonamide trisulfonic acid and copper phthalocyanine di-[N-(4-amino-3-sulfophenyl)-sulfonamide] disulfonic acid.

The aminophthalocyanines used in the process are new compounds which differ from previously known phthalocyanines containing amino groups by the presence of the solubilising group or groups. When the solubilising group is sulfonic acid they can be manufactured either by the sulfonation of known phthalocyanines containing primary or secondary amino groups or by synthesis from mixtures of phthalic acid derivatives and sulfonated phthalic acid derivatives. Thus treatment with a sulfonating agent for example oleum such as a 20% solution of sulfur trioxide in sulfuric acid of the amines described in United Kingdom specifications Nos. 569,200 and 589,118 gives aminophthalocyanines suitable for use in the above process. The aminophthalocyanine compounds so obtained are those of the above formula wherein Y stands for the divalent bridging radicals -phenylene-, —CO-phenylene-, —SO₂-phenylene-, —NH-phenylene-, —S-phenylene-, —O-phenylene-, —CH₂S-phenylene-, —CH₂O-phenylene-, —CH₂-phenylene-, —SCH₂-phenylene- and —SO₂CH₂-phenylene-.

The aminophthalocyanines for use in the above process which contain the divalent bridging radicals mentioned in the previous paragraph and also those containing —NR′CO-phenylene-, —SO₂NR′-phenylene-, —NR′SO₂-phenylene-, and —SO₂O-phenylene- groups, may be obtained by heating together suitable derivatives of sulfonated phthalic acid and the substituted phthalic acids mentioned in the aforesaid United Kingdom specifications Nos. 569,200 and 589,118 by the general methods known to be used for the manufacture of phthalocyanines from suitable phthalic acid derivatives, for example, by heating together a mixture of 4-sulfophthalic anhydride and 4-p-nitrobenzoylphthalic anhydride, urea, cupric chloride, and ammonium molybdate in o-dichlorobenzene at about 150° C. The aminophthalocyanines which contain the —CH₂-linkage may be obtained by sulfonation of the primary and secondary amines of United Kingdom specifications Nos. 717,137 and 724,212. The aminophthalocyanines which contain the —CH₂NR′-phenylene-linkage may be obtained by reacting a primary (or secondary N-alkyl- or cycloalkyl-)nitroaniline with a phthalocyanine containing chloromethyl and sulfonic or carboxylic acid groups obtained by chloromethylation of a phthalocyanine sulfonic or carboxylic acid, and reducing the product so obtained for example with sodium sulfide or by reacting a chloro-methyl phthalocyanine with for example a diaminobenzenesulfonic acid or diaminobenzenecarboxylic acid. The aminophthalocyanines which contain the —SO₂NR′— alkylene-linkage may be obtained by reacting a phthalocyanine containing chlorosulfonyl groups with a monoacetyl alkylene diamine in the presence of water, and treating the product so obtained (which contains both sulfonamide and sulfonic acid groups) with aqueous alkali to hydrolyse the acetylamino groups, monoacetyl piperazine gives analogous products in which R and R′ together represent an ethylene radical. The aminophthalocyanines which contain the —SO₂NR′-phenylene-CH₂— group may be obtained in a similar manner by using an amino-N-benzylacetamide in place of the mono-acetylalkylene diamine. The aminophthalocyanines which contain the —CH₂.NR′— alkylene linkage may be obtained by reacting a phthalocyanine containing chloromethyl and sulfonic or carboxylic acid groups with a monoacetyl alkylene diamine and treating the product so obtained with aqueous alkali to hydrolyse the acetylamino groups. The aminophthalocyanines in which the amino group is attached directly to the phthalocyanine nucleus, may be obtained by sulfonating the amino-phthalocyanines described in United Kingdom specification No. 529,847 or where a starting material containing less than 4 amino groups attached to the phthalocyanine nucleus is desired, it may be obtained by heating together a mixture of suitable carboxy- or sulfophthalic acid derivatives with one of the substituted phthalic acid derivatives used as starting materials in United Kingdom specification No. 529,847 under conditions known to be used for the manufacture of phthalocyanines from phthalic acid derivatives, for example by heating the anhydrides with urea and a catalyst for example ammonium molybdate in an organic solvent, for example o-dichlorobenzene and reducing the nitro-phthalocyanine sulfonic or carboxylic acid or hydrolysing the acylaminophthalocyanine sulfonic or carboxylic acid so obtained by known methods for the conversion of aromatic nitro or acylamino compounds to the corresponding amines. The aminophthalocyanines containing the —CO.NR′-phenylene- linkage may be obtained by reacting a phthalocyanine compound containing carboxylic acid chloride groups with a diaminobenzene sulfonic acid or carboxylic acid or with an aminobenzene sulfonic acid or an aminobenzoic acid which also contains a nitro group and reducing the nitro compound so obtained. The aminophthalocyanines containing the —CO—NR-phenylene-CH₂— linkage may be obtained by reacting a phthalocyanine compound containing carboxylic acid chloride groups with an N-(amino-benzyl) acetamide and hydrolysing the product so obtained with aqueous alkali.

The aminophthalocyanines containing the

—SO₂.NR—B— linkage, where B is used for convenience to represent a mono-or di-cyclic radical of the benzene series, can readily be obtained by condensing a chlorosulfonated phthalocyanine (such as the product obtained by heating copper phthalocyanine or copper phthalocyanine tri- or tetra-4-sulfonic acid with chlorosulfonic acid alone or in the presence of thionyl chloride) with a mono- or di-cyclic diamine of the benzene series such as m- or p-phenylene diamine, 4-methylamino aniline and 4,4′-diaminostilbene-2,2′-disulfonic acid, or with the monoacetyl derivative of a diamine of this type in which case the reaction product is hydrolysed after the condensation stage.

In carrying out the process of the invention, the reagents are dissolved or suspended in a liquid medium, preferably an aqueous medium, and the mixture is stirred until the reaction is complete. If desired an acid binding agent for example sodium carbonate may be added to the reaction mixture to remove the mineral acid formed during the reaction.

In order that side reactions, for example hydrolysis, of the halogen atoms attached to the triazine rings are minimised during manufacture and storage, it is generally preferable to carry out the reaction at a temperature below 30° C. and preferably between 0° C. and 5° C. and to isolate the new dyestuffs from the media in which they have been formed at a pH of from 6 to 8, and to dry the resultant dyestuff pastes at relatively low temperatures, for example between 20° C. and 40° C. preferably in the presence of buffering agents suitable for maintaining a pH value of about 6.5. Examples of such buffering agents are mixtures of sodium dihydrogen phosphate and disodium hydrogen phosphate or of disodium hydrogen phosphate and potassium dihydrogen phosphate.

The compounds of this invention are valuable blue to green dyestuffs for cellulosic and nitrogen-containing textile materials, for example textile materials made from animal fibres such as wool and silk, and from artificial fibers such as superpolyamide and superpolyurethane. The colouration (that is, dyeing and printing) of cellulosic textile materials such as cotton, linen and viscose rayon is preferably carried out in conjunction with a treatment with an alkaline agent for example caustic soda, sodium carbonate, sodium phosphate or sodium metasilicate, in aqueous medium, said treatment being carried out prior to, simultaneously with or after the application of the dyestuff. Alternatively the colouration of cellulosic textile materials may be carried out in conjunction with a treatment with a substance for example sodium bicarbonate which, on heating or steaming, changes from a weakly acid state or weakly alkaline state to a more strongly alkaline state, and subsequently subjecting the textile material to the action of heat or steam.

The blue to green colourations so obtained have high fastness to repeated washing.

The invention is illustrated but not limited by the following examples in which the parts and percentages are by weight:

*Example 1*

56.8 parts of copper phthalocyanine-N-(4-amino-3-sulfophenyl)-sulfonamide-sulfonic acid (obtained as described below) are dissolved in 3000 parts of water and sufficient 2N aqueous sodium carbonate solution to give a solution of pH 7 and the solution is added dropwise, during 30 minutes to a stirred suspension of 20 parts of cyanuric chloride (prepared by dissolving the latter in 80 parts of acetone and drowning the solution in 300 parts of ice-water), whilst the temperature is maintained between 0° C. and 10° C. by cooling in an ice-bath. The mixture is stirred for 3 hours, then filtered. The filtrate is adjusted to pH 7 by the addition of 2 N aqueous sodium carbonate solution, and is then diluted to a total of 5000 parts. A solution of 60 parts of disodium hydrogen phosphate and 120 parts of potassium dihydrogen phosphate in 1000 parts of water is added, followed by 1000 parts of sodium chloride and the precipitated dyestuff is filtered off, washed with a solution of 500 parts of sodium chloride, 30 parts of disodium hydrogen phosphate and 60 parts of potassium dihydrogen phosphate in 2400 parts of water and dried. The product when applied to cotton by padding through a solution of the dyestuff, followed by an after treatment with aqueous sodium hydroxide gives dyeings of greenish-blue shade and good fastness to washing.

The copper phthalocyanine-N-(4-amino-3-sulfophenyl)-sulfonamide-sulfonic acid employed as starting material may be obtained as follows: 288 parts of copper phthalocyanine is converted to the tetrasulfonchloride by the method described in Example 1 of United Kingdom specification No. 515,637 and the moist cake is suspended in 3000 parts of ice-water. 336 parts of sodium bicarbonate are added, then a solution of 188 parts of 2:5-diaminobenzene sulfonic acid in 1500 parts of water and 1000 parts of N aqueous sodium bicarbonate solution. The mixture is stirred for 18 hours, during which time the temperature is allowed to rise to 25° C. then the resulting blue solution is acidified by addition of 360 parts of 38% aqueous hydrochloric acid. The mixture is filtered and the solid residue is washed with 2 N aqueous hydrochloric acid and dried to give a blue powder.

*Example 2*

13.6 parts of copper phthalocyanine-N-(4-β-hydroxyethylamino - 3 - sulfophenyl)-sulfonamide-sulfonic acid (prepared as described below) are dissolved in 600 parts of water containing sufficient 2 N aqueous sodium carbonate solution to give a solution of pH 7 and the solution is added to an aqueous acetone suspension of 4.2 parts of cyanuric chloride (obtained from a solution of the latter in 20 parts of acetone by drowning into 200 parts of ice-water), and the mixture is stirred, maintaining the temperature at 0–5° C. by cooling in an ice-bath. The pH of the mixture is maintained at 7 by frequent additions of 2 N aqueous sodium carbonate solution until the reaction is complete. A solution of 12 parts of disodium hydrogen phosphate and 24 parts of potassium dihydrogen phosphate in 164 parts of water is added, followed by 600 parts of sodium chloride and the precipitate is filtered off, washed with a solution of 50 parts of sodium chloride, 3 parts of disodium hydrogen phosphate and 6 parts of potassium dihydrogen phosphate in 240 parts of water and dried.

On application to cotton by padding the latter through a solution of the dyestuff, followed by an after-treatment with hot aqueous alkali turquoise blue dyeings of good fastness to washing are obtained.

The copper phthalocyanine-N-(4-β-hydroxyethylamino-3-sulfophenyl)sulfonamide-sulfonic acid used as starting material may be obtained by the process described in the final paragraph of Example 1 by substituting 228 parts of 5-amino-2-β-hydroxyethylaminobenzenesulfonic acid for the 2:5 diaminobenzenesulfonic acid used therein. The product is a blue powder.

A similar dyestuff is obtained by the use of 429 parts of 4:4'-diaminodiphenyl-3-sulfonic acid in the above reaction with copper phthalocyanine tetrasulfonchloride and condensation of the product with cyanuric chloride.

*Example 3*

11.05 parts of copper phthalocyanine-4-N(3'-amino-4'-sulfophenyl)sulfonamide and sulfonic acid (obtained as described below) are dissolved in 600 parts of water and the solution is adjusted to pH 7 by addition of aqueous sodium carbonate solution. The resulting solution is added to a suspension of 3.7 parts of cyanuric chloride in 40 parts of acetone and 200 parts of ice-water obtained by the method described in Example 1. After completion of the reaction at 0–5° C. the product is isolated as described in Example 2 and dried to give a bright blue powder.

This dyestuff when applied to cotton by the method outlined in Example 2 gives dyeings of bright greenish-blue shade fast to light, bleach and acid treatments.

The copper phthalocyanine-sulfonamide sulfonic acid used as starting material may be obtained as follows: 4750 parts of chlorosulfonic acid are stirred at 20–25° C. and 448 parts of copper phthalocyaninetetra-4-sulfonic acid are added portionwise over approximately 30 minutes. The mixture is stirred at this temperature until solution is complete. The solution is then heated to 115° C. in approximately 30 minutes and maintained at 115° C. to 120° C. for 4 hours. The mixture is cooled to 20° C. and drowned into ice-water with stirring, ice being added if necessary to maintain the temperature below 2° C. and the precipitated sulfonchloride is filtered off, washed with a little ice-water and well drained. The filter cake is suspended in 10,000 parts of ice-water, and any residual acidity is neutralised to pH 7 by means of sodium carbonate. 336 parts of sodium bicarbonate are added, followed by a solution of 156 parts of sodium bicarbonate and 282 parts of 2:4-diamino-benzenesulfonic acid in 2000 parts of water and the mixture is stirred for 16 hours the temperature being raised slowly to 20° C. to 25° C. The resulting suspension is acidified by addition of 360 parts of 38% aqueous hydrochloric acid. The mixture is filtered, and the residue on the filter is washed well with 2 N aqueous hydrochloric acid and dried to give a blue powder.

Example 4

60 parts of copper(4-amino)-phthalocyanine sulfonic acid (obtained as described below) are dissolved in 3000 parts of water and sufficient 2 N aqueous sodium hydroxide solution to give a solution of pH 7. The solution is added to a stirred suspension of 40 parts of cyanuric chloride (prepared by dissolving the latter in 200 parts of acetone and drowning the solution in 2000 parts of ice-water and 2000 parts of crushed ice). 2 N aqueous sodium carbonate solution is added dropwise to the stirred mixture to maintain the pH just below 7, whilst the temperature is maintained between 0° C. and 5° C. by cooling in an ice-bath. When the pH of the mixture remains steady just below 7, addition of sodium carbonate solution is stopped and a solution of 6 parts of disodium hydrogen phosphate and 12 parts of potassium dihydrogen phosphate in 100 parts of water is added, followed by 2100 parts of sodium chloride. The precipitate is separated by filtration, washed with a solution of 50 parts of sodium chloride, 3 parts of disoduim hydrogen phosphate and 6 parts of potassium dihydrogen phosphate in 240 parts of water and dried.

The dyestuff so obtained when applied to cotton by the method described in Example 1 gives dyeings of bluish-green shade and good fastness to washing.

The copper(4-amino)-phthalocyanine sulfonic acid used as starting material may be obtained as follows: 422 parts of 4-nitrophthalimide, 264 parts of phthalimide, 2400 parts of urea, 200 parts of anhydrous cupric chloride, 25 parts of ammonium molybdate and 6450 parts of 1:2:4-trichlorobenzene are heated at a temperature of 150° C. to 155° C. for 4 hours. The copper 4-nitrophthalocyanine thus obtained is isolated by filtration and purified by washing with ethanol, then with hot 2 N aqueous hydrochloric acid for 1 hour, then with water until acid-free, then with hot N aqueous sodium hydroxide for 1 hour, then with water until alkali-free and then dried. 526 parts of the product are dissolved in 5260 parts of concentrated sulfuric acid and the solution is drowned into a large volume of ice-water. The precipitated solid is filtered and washed acid-free, and the moist paste is gravel milled for 48 hours with 500 parts of a 15% aqueous solution of sodium hydrogen sulphide. The resulting suspension is filtered, washed free from alkali and sulphide with water, and dried.

323 parts of the product are dissolved in 3720 parts of a 20% solution of sulfur trioxide in sulfuric acid. The solution is heated to a temperature of 85° C. and maintained at this temperature for 4 hours, cooled and drowned into sufficient crushed ice and water to maintain the temperature below 5° C. The precipitated product is filtered off, washed with 5000 parts of a 2.5 N aqueous solution of hydrochloric acid, and dried to give a blue powder.

Example 5

The process described in Example 4 is repeated except that the copper(4-amino)-phthalocyanine sulfonic acid is replaced by 60 parts of copper 4-p-aminobenzoyl phthalocyanine-3-sulfonic acid (obtained as described below). When applied to cotton by the process described in Example 1 the dyestuff so obtained gives dyeings of greenish-blue shade and good fastness to washing.

The copper 4-p-aminobenzoyl-phthalocyanine-3-sulfonic acid employed as starting material may be obtained by the process described in Example 4 for copper(4-amino)-phthalocyanine sulfonic acid except that the 4-nitrophthalimide is replaced by 445.5 parts of 4-p-nitrobenzoylphthalic anhydride (obtained as described in United Kingdom specification No. 569,200) and the quantities of phthalimide and 1:2:4-trichlorobenzene used are 367.5 parts and 7670 parts respectively.

Example 6

The process described in Example 4 is repeated except that the copper(4-amino)-phthalocyanine sulfonic acid is replaced by 60 parts of copper 4-p-aminobenzene sulfonylphthalocyanine sulfonic acid (obtained as described below). When applied to cotton by the process described in Example 1 the dyestuff so obtained gives dyeings of greenish-blue shade and good fastness to washing.

The copper 4-p-aminobenzenesulfonyl phthalocyanine sulfonic used as starting material may be obtained by the process described in Example 4 for copper(4-amino)-phthalocyanine sulfonic acid except that the 4-nitrophthalimide is replaced by 600 parts of 4-p-nitrobenzenesulfonyl phthalic anhydride (obtained as described in United Kingdom specification No. 569,200) and the quantities of phthalimide and 1:2:4-trichlorobenzene used are 323 parts and 8700 parts respectively.

Example 7

The process described in Example 4 is repeated except that the copper 4-aminophthalocyanine sulfonic acid is replaced by 60 parts of copper 4-p-aminophenylmercaptophthalocyanine sulfonic acid (obtained as described below). When applied to cotton by the process described in Example 1 the dyestuff as obtained gives dyeings of bluish-green shade and good fastness to washing.

The copper 4-p-aminophenylmercaptophthalocyanine sulfonic acid used as starting material may be obtained by the process described in Example 4 for copper(4-amino)-phthalocyanine sulfonic acid except that the 4-nitrophthalimide is replaced by 542 parts of 4-p-nitrophenylmercaptophthalic anhydride (obtained as described in United Kingdom specification No. 589,118), and the quantities of phthalimide and 1:2:4-trichlorobenzene used are 323 parts and 8170 parts respectively.

Example 8

16.5 parts of nickel phthalocyanine-N-(3'-amino-4'-sulfophenyl)sulfonamide-sulfonic acid (obtained as described below) are dissolved in 300 parts of aqueous sodium carbonate solution to give a solution of pH 7 and condensed with 4.6 parts of cyanuric chloride by the method described in Example 3, and isolated similarly and dried to give a greenish-blue powder.

The dyestuff so obtained dyes cellulosic fibres in greenish-blue shades, duller and greener than the corresponding copper derivative, but comparable in fastness properties.

The nickel phthalocyanine-N-(3'amino-4'-sulfophenyl) sulfonamide-sulfonic acid may be obtained by chlorosulfonating nickel phthalocyanine with chlorosulfonic acid at a temperature of 135° C. to 140° C. and condensing the product with three molecular equivalents of 2:4-diaminobenzene-sulfonic acid per mole of nickel phthalocyanine by the method described in Example 1.

Example 9

11.4 parts of copper phthalocyanine-N-(3'-amino-4'-sulfophenyl)sulfonamide-sulfonic acid (obtained as described below are condensed with 3.7 parts of cyanuric chloride by the method described in Example 2 and isolated similarly by adding buffer solution and salt to precipitate the dyestuff. The dyestuff so obtained is similar in properties to the product of Example 1.

The starting material used in the above Example may be obtained by dissolving 288 parts of copper phthalocyanine in 3000 parts of chlorosulfonic acid at 20° C. raising the temperature during 30 minutes to 130° C. and maintaining the solution at this temperature for 1 hour. The product, essentially copper phthalocyanine tri-sulfonchloride, is interacted with 188 parts of 2:4-diaminobenzene sulfonic acid in similar manner to the method described in Example 1.

Similar dyestuffs are obtained by condensation of cyanuric chloride with copper phthalocyanine-N-(3'-amino-6' - methyl - 4' - sulfophenyl)sulfonamide-sulfonic acids. These may be obtained by condensing the sulfonyl chlorides used in Example 1 or the above example with 2:4-diamino-5-methylbenzene-sulfonic acid.

*Example 10*

31.2 parts of copper phthalocyanine-4-N-(3'-amino-4'-sulfophenyl)sulfonamide - 4 - sulfonic acid (obtained in similar manner to the starting material use in Example 3 but starting from 408 parts of copper phthalocyanine-tri-4-sulfonic acid and 188 parts of 2:4-diaminobenzene-sulfonic acid) are condensed with 9.2 parts of cyanuric chloride in similar manner to the process described in Example 1 and isolated similarly.

The dyestuff so obtained dyes cellulosic fibres in the previously described manner in turquoise blue shades of high fastness properties.

*Example 11*

13.2 parts of copper phthalocyanine-N-[β-(4'-amino-2'-sulfophenylamino)-ethyl] sulfonamide-sulfonic acid are dissolved in 200 parts of water, adjusted to pH 7 by addition of aqueous sodium carbonate solution and condensed with 3.7 parts of cyanuric chloride in similar manner to the method described in Example 2 and isolated by addition of buffer solution and sodium chloride to give a greenish-blue dyestuff.

The starting material used above may be obtained as follows: 288 parts of copper phthalocyanine are converted to the tetrasulfon-chloride as in Example 1 and condensed with 261 parts of 2-β-aminoethylamino-5-nitrobenzene-sulfonic acid instead of 188 parts of 2:5-diaminobenzene sulfonic acid. The resulting solution is reduced by addition of sodium sulfide at a temperature of 20° C. to 25° C. and the product is isolated by acidification with aqueous hydrochloric acid. The precipitate is filtered off, washed with 2 N aqueous hydrochloric acid and dried to give a blue powder.

Similar products are obtained by condensing cyanuric chloride with the sulfonamides obtained by reacting copper phthalocyaninesulfon chlorides with 4-nitro-4'-aminostilbene-2:2'-sulfonic acid, 2-nitro-5-aminobenzoic acid or 4-nitro-4'-aminodiphenylamine - 3 - sulfonic acid and reducing the product in similar manner to the method described above.

*Example 12*

46.5 parts of copper phthalocyanine-N-β-aminoethylsulfonamide-sulfonic acid (prepared as described below) are dissolved in 60 parts of N-aqueous sodium hydroxide solution and 500 parts of water at 40° C. cooled to 0° C. and added to a suspension of 14 parts of cyanuric chloride in 100 parts of acetone and 800 parts of ice-water. The mixture is stirred at 0° C. and the pH adjusted to 7 at intervals by addition of N aqueous sodium hydroxide solution. When the reaction is complete a finely powdered mixture of 12 parts of disodium hydrogen phosphate and 24 parts of potassium dihydrogenphosphate is added, thereby reducing the pH to 6.4, 60 parts of sodium chloride is added and the precipitated dyestuff is filtered off and dried in a vacuum desiccator. The dyestuff so obtained dyes cellulosic fibres in bright greenish-blue shades.

The copper phthalocyanine-N-β-aminoethylsulfonamide-sulfonic acid used above may be prepared as follows: 38.4 parts of copper phthalocyanine are chlorosulfonated as described in Example 1 and the sulfon chloride obtained is suspended in 750 parts of ice-water and neutralised by addition of sodium bicarbonate. 44.8 parts of sodium bicarbonate and 13.6 parts of mono-N-acetylethylenediamine are added, the suspension is stirred for 18 hours during which time the temperature is raised to 20° C. 75 parts of sodium hydroxide are added and the solution is refluxed for 1 hour. The resulting solution is filtered hot, cooled to 20° C. and acidified to Congo Red by addition of 38% aqueous hydrochloric acid. The precipitated solid is filtered off, washed with water until free from mineral acid and dried at 80° C. to give a bright blue powder.

*Example 13*

A solution of 50 parts of copper phthalocyanine-N-sulfonpiperazide-sulfonic acid in 100 parts of N aqueous sodium hydroxide and 450 parts of water is condensed with 15 parts of cyanuric chloride in similar manner to the process described in Example 12, and isolated in a similar manner, to give a bright blue dyestuff which dyes cellulosic fibres in turquoise blue shades.

The copper phthalocyanine sulfonpiperazide employed above may be prepared in the following manner: 38.4 parts of copper phthalocyanine are converted to the sulfonchloride as described in Example 1, suspended in 750 parts of ice-water and neutralised by addition of sodium bicarbonate. A further 44.8 parts of sodium bicarbonate are added, followed by 25.2 parts of monoacetylpiperazine monoacetate and the whole is stirred for 18 hours, during which the temperature is raised to 20° C. 75 parts of sodium hydroxide are added, the mixture is heated to boiling under reflux for 1 hour, filtered hot and cooled to 20° C. the mixture is acidified to Congo Red paper by addition of 38% aqueous hydrochloric acid, the precipitated solid is filtered off, washed with 200 parts of 2 N aqueous hydrochloric acid and dried at 80° C.

*Example 14*

11.05 parts of copper phthalocyanine-4-N-(3'-amino-4'-sulfophenyl)-sulfonamide-4-sulfonic acid, prepared as described in Example 3, are dissolved in 300 parts of water, adjusted to pH 7 by addition of aqueous 2 N sodium carbonate solution, and added to a suspension of 4 parts of cyanuric bromide, prepared by dissolving the latter in 50 parts of dioxan and drowning the solution into 200 parts of ice-water with stirring. The mixture is then heated to a temperature of 20° C. treated with 6.25 parts of aqueous 2 N sodium carbonate solution and stirred for 18 hours. The resulting solution is filtered, and a solution of 6 parts of disodium hydrogen phosphate and 12 parts of potassium dihydrogen phosphate in 82 parts of water and then 100 parts of sodium chloride are added. The precipitated product is filtered off, washed with a solution of 50 parts of sodium chloride, 3 parts of disodium hydrogen phosphate and 6 parts of potassium dihydrogen phosphate in 240 parts of water and dried.

The dyestuff is similar in properties to the dyestuff described in Example 3.

*Example 15*

20 parts of copper phthalocyanine-4-N-(3'-amino-4'-sulfophenyl)-sulfonamide sulfonic acid (as used in Example 3) are dissolved in 800 parts of water by the addition of 2 N sodium carbonate solution until the pH of the solution is between 6 and 7. A solution of 5 parts of 2:4-dichloro-6-methoxy-s-triazine in 100 parts of dioxan is added and the mixture is heated at 40° C. the pH of the mixture being kept between 6 and 7 by the addition of 2 N sodium carbonate solution.

When the reaction is complete 100 parts of salt are added and the dyestuff which precipitates is filtered off, washed with brine and dried.

*Example 16*

40 parts of copper phthalocyanine-4-N-(3'-amino-4'-sulfophenyl)-sulfonamide sulfonic acid (as used in Example 3) are dissolved in 1400 parts of water by the addition of 2 N sodium carbonate solution until the pH of the solution is between 6 and 7. A solution of 12 parts of 2:4-dichloro-6-phenoxy-s-triazine in 40 parts of acetone is added, and the mixture is heated at 80° C. the pH of the mixture being kept between 6 and 7 by the addition of 2 N sodium carbonate solution.

When the reaction is complete 150 parts of salt are added and the dyestuff which precipitates is filtered off, washed with brine and dried.

*Example 17*

15 parts of the product of Example 3 are stirred in 1000 parts of water and a solution of 4.8 parts of sodium thiophenol m-sulfonate in 200 parts of water containing 22.4 parts of 4% sodium hydroxide solution is added. The mixture is stirred at 45° C. for 3 hours. Then 300 parts of potassium chloride are added, and the precipitated dyestuff is filtered off, washed with 30% potassium chloride solution and dried.

The product obtained gives blue dyeings on cotton which are very fast to washing when the cotton is added in the dyestuff solution and then treated with dilute caustic soda solution.

*Example 18*

15 parts of copper phthalocyanine 3-(N-3'-amino-4'-sulfophenyl)sulfonamide-sulfonic acid (obtained as described below) are stirred in 1000 parts of water and 8% sodium hydroxide solution is added until the pH of the solution is between 6 and 7. A solution of 5.85 parts of 2-p-methylphenylthio-4:6-dichloro-s-triazine in 50 parts of acetone is added, and the mixture is stirred at from 70° C. to 75° C. until the reaction is complete. 10% aqueous sodium carbonate solution is added during the reaction period to keep the pH of the reaction mixture between 6 and 7. 300 parts of salt are then added, the mixture is cooled to room temperature and the precipitate so obtained is filtered off and dried.

The blue product when padded on to cotton and subjected to an alkaline aftertreatment gives bright greenish-blue shades of good fastness to washing.

The copper phthalocyanine-3-(N-3'-amino-4'-sulfophenyl)sulfonamide-sulfonic acid used in the above example may be obtained by the method described in Example 1 but using 188 parts of 2:4-diaminobenzene sulfonic acid instead of the 2:5-diaminobenzene sulfonic acid.

*Example 19*

If the solution of 2-p-methylphenylthio-4:6-dichloro-s-triazine in acetone used in Example 18 is replaced by a solution of 6.5 parts of 2-p-nitrophenylthio-4:6-dichloro-s-triazine in 50 parts of acetone, a similar product is obtained.

*Example 20*

13 parts of copper phthalocyanine-3-[N-3'-(dichloro-s-triazinylamino)-4'-sulfophenyl]sulfonamide sulfonic acid (obtained as described below) are stirred in 800 parts of water between 5 and 10° C. and a solution of 1.65 parts of p-thiocresol and 0.53 part of sodium hydroxide in 50 parts of water is added. The mixture is heated between 40 and 45° C. and stirred for 2 hours. 160 parts of salt are then added, the mixture is cooled to 20° C. and the precipitate is filtered off and dried.

The product so obtained and the product of Example 18 appear to be identical.

The copper phthalocyanine-3-[N-3'-(dichloro-s-triazinylamino)-4'-sulfophenyl]sulfonamide sulfonic acid used in the above example may be obtained as follows:

56.8 parts of copper phthalocyanine-3-(N-3'-amino-4'-sulfophenyl)sulfonamide sulfonic acid (as used in Example 18) are dissolved in 3000 parts of water and sufficient 2N aqueous sodium carbonate solution to give a solution of pH 7 and the solution is added dropwise, during 30 minutes to a stirred suspension of 20 parts of cyanuric chloride (prepared by dissolving the latter in 80 parts of acetone and drowning the solution in 300 parts of ice-water), whilst the temperature is maintained between 0° C. and 10° C. by cooling in an ice-bath. The mixture is stirred for 3 hours, then filtered. The filtrate is adjusted to pH 7 by the addition of 2N aqueous sodium carbonate solution, and is then diluted to a total of 5000 parts. A solution of 60 parts of disodium hydrogen phosphate and 120 parts of potassium dihydrogen phosphate in 1000 parts of water is added, followed by 1000 parts of sodium chloride and the precipitated dyestuff is filtered off, washed with a solution of 500 parts of sodium chloride, 30 parts of disodium hydrogen phosphate and 60 parts of potassium dihydrogen phosphate in 2400 parts of water and dried.

*Example 21*

If in Example 20, the p-thiocresol is replaced by 1.92 parts of p-chlorothiophenol, other conditions being the same, a similar product is obtained.

*Example 22*

If in Example 20 the p-thiocresol is replaced by 2.06 parts of p-nitrothiophenol, other conditions being the same, a similar product is obtained. This product and the product of Example 19 appear to be identical.

*Example 23*

12 parts of copper phthalocyanine-4-(N-3'-amino-4'-sulfophenyl)sulfonamide sulfonic acid (obtained as described in Example 3) are dissolved in 600 parts of water and sufficient 2N aqueous sodium carbonate solution is added to give a solution of pH 7. 4.2 parts of 2-p-nitrothiophenoxy-4:6-dichloro-s-triazine dissolved in 100 parts of dioxan are added and the mixture is stirred at 45° C. the pH being adjusted to pH 7 at short intervals by addition of 10% aqueous sodium carbonate solution until no further acid has been formed. 70 parts of sodium chloride are added and the precipitated dyestuff is filtered off, washed with 10% brine and dried.

The product obtained is very similar to that obtained by the process described in Example 17.

A similar product is also obtained if the solution of sodium thiophenol-3-sulfonate used in Example 17 is replaced by a solution of 2.5 parts of p-chlorothiophenol in acetone.

*Example 24*

10.2 parts of a copper phthalocyanine-3-N-(4'-amino-3'-methoxyphenyl)sulfonamide sulfonic acid (obtained as described below) are suspended in 500 parts of water and 8% aqueous sodium hydroxide solution is added until a clear solution is obtained and the pH of the solution is between 6 and 7. 3.07 parts of 2-p-chlorophenylthio-4,6-dichloro-s-triazine are added and the mixture is stirred at from 70 to 75° C. until the reaction is complete. At the same time, 10% aqueous sodium carbonate solution is added to keep the pH at between 6 and 7.

150 parts of sodium chloride are added, the mixture is cooled to 20° C. and the precipitate is filtered off and dried. The product so obtained dyes cotton and viscose rayon in bright greenish blue shades fast to washing.

The copper phthalocyanine-3-N-(4'-amino-3'-methoxyphenyl)sulfonamide sulfonic acid used may be obtained as follows:

A mixture of 288 parts of copper phthalocyanine and 1350 parts of chlorosulfonic acid is heated at 135–140° C. for 3 hours, then cooled to 20° C. and drowned into a mixture of ice and water keeping the temperature below 2° C. The precipitate is filtered off and washed with 2000 parts of 1% aqueous hydrochloric acid cooled to 0° C.

The filter cake is stirred with 1500 parts of ice and 1500 parts of water and 2 N-aqueous sodium hydroxide solution is added until the pH is 5. 90 parts of 5-amino-2-methoxy-acetanilide are added and the mixture is heated slowly to 40–45° C. and stirred at this temperature while maintaining the pH at from 5.0 to 5.5 by slow addition of the 2 N-aqueous sodium hydroxide solution. After 3 hours the mixture is made weakly alkaline with sodium hydroxide solution and then heated for 1 hour at 80° C. 1000 parts of concentrated aqueous hydrochloric acid are added to the mixture at 80° C. and the temperature is maintained at 70–80° C. for 3 hours to hydrolyse the acetylamino group. The mixture is cooled, filtered and the product on the filter is washed with 2000 parts of 1% aqueous hydrochloric acid and dried.

If, in place of the 90 parts of 5-amino-2-methoxy-acetanilide used to prepare the starting material used in the above example there are used the quantities of the amines given in the following table, other dyestuffs having similar properties are obtained.

| Amine | Parts by weight used |
|---|---|
| (25) 5-amino-2-methyl acetanilide | 82.0 |
| (26) 5-amino-2-chloro acetanilide | 92.25 |
| (27) 4-amino-4'-acetylaminodiphenylamine-2-sulfonic acid | 160.5 |
| (28) 4-amino-4'-acetylamino diphenyl sulfone | 145.0 |
| (29) 4-amino-4'-acetylaminodiphenyl ether | 121.0 |
| (30) 4-amino-4'-acetylamino diphenyl sulfide | 129.0 |
| (31) 4-amino-4'-acetylamino stilbene-2',2-disulfonic acid | 206.0 |
| (32) 1-(4-aminophenoxy)-2-(4''-acetylamino-phenoxy) ethane | 143.0 |
| (33) 4-amino-4'-acetylamino benzanilide | 134.4 |
| (34) 4-N-(4-aminophenyl)ureidoacetanilide | 142.0 |
| (35) 4-amino-4'-acetylamino azobenzene-2-sulfonic acid | 167.0 |
| (36) 2-(p-aminophenyl)-5-(p-acetylamino-phenyl)-1,3,4-oxadiazole | 147.0 |

*Examples 37 to 39*

If the 2,4-diaminobenzene sulfonic acid used to prepare the copper phthalocyanine-3-N-(3'-amino-4'-sulfophenyl)sulfonamide-sulfonic acid used in Example 18, is replaced by—

(a) An equal weight of 2,5-diaminobenzene sulfonic acid or
(b) 202 parts of 2-methylamino-5-aminobenzene sulfonic acid or
(c) 202 parts of 2,4-diaminotoluene-5-sulfonic acid and the products so obtained are condensed with 2-p-chlorophenylthio-4,6-dichloro-s-triazine the dyestuffs obtained have similar properties to that described in Example 18.

*Example 40*

If the copper phthalocyanine-3-(N-4'-amino-3'-methoxyphenyl)sulfonamide sulfonic acid used in Example 24 is replaced by 9.1 parts of 4-p-aminobenzoyl nickel phthalocyanine tri-4-sulfonic acid, the dyestuff obtained gives greener and duller shades.

4-p-aminobenzoyl nickel phthalocyanine tri-4-sulfonic acid may be obtained as follows:

1-molecular proportion of 4-p-nitrobenzoylphthalic acid and 3 molecular proportions of the monopotassium salt of 4-sulfophthalic acid are heated at 145 to 150° C. for 3 hours with urea, anhydrous nickel chloride and ammonium molybdate in α-chloro naphthalene as solvent to give 4-p-nitrobenzoyl nickel phthalocyanine tri-4-sulfonic acid. The crude product so obtained is washed with ethanol until free from α-chloronaphthalene then dissolved in water and reduced by treatment with sodium hydrogen sulfide. Sodium chloride is added and the precipitate is filtered off, washed free from sulfide ions with 20% brine, then redissolved in water and re-precipitated by the addition of concentrated hydrochloric acid. The precipitate is filtered off and dried.

*Example 41*

If the copper phthalocyanine-3-N-(4'-amino-3'-methodyphenyl)sulfonamide sulfonic acid used in Example 24 is replaced by 9.5 parts of 4-p-aminophenylsulfonyl copper phthalocyanine tri-4-sulfonic acid, the dyestuff obtained gives greener and duller shades.

4-p-aminophenylsulfonyl copper phthalocyanine tri-4-sulfonic acid may be obtained by the method described in Example 40 for the preparation of 4-p-aminobenzoyl nickel phthalocyanine tri-4-sulfonic acid, except that the 4-p-nitrobenzoylphthalic acid and anhydrous nickel chloride are replaced by the equivalent amounts of 4-p-nitrophenyl sulfonyl phthalic acid and anhydrous cupric chloride respectively.

*Example 42*

If the copper phthalocyanine-3-N-(4'-amino-3'-methoxyphenyl)sulfonamide sulfonic acid used in Example 24 is replaced by 9.0 parts of 4-p-aminophenoxy copper phthalocyanine tri-4-sulfonic acid a dyestuff giving greener and duller shades is obtained; 4-p-aminophenoxy copper phthalocyanine tri-4-sulfonic acid may be obtained by the method described in Example 40 for the preparation of 4-p-aminobenzoyl nickel phthalocyanine tri-4-sulfonic acid except that the 4-p-nitrobenzoyl phthalic acid and anhydrous nickel chloride are replaced by equivalent quantities of 4-p-nitrophenoxyphthalic acid and anhydrous cupric chloride respectively.

*Example 43*

23.3 parts of di-4-p-aminobenzoylamine copper phthalocyanine tetrasulfonic acid (obtained as described below) are stirred in 1000 parts of water and 8% sodium hydroxide solution is added until the pH of the solution is between 6 and 7. A solution of 12.3 parts of 2-p-chlorophenylthio-4,6-dichloro-s-triazine in 50 parts of acetone is added, and the mixture is stirred at from 70° C. to 75° C. until the reaction is complete. 10% aqueous sodium carbonate solution is added during the reaction period to keep the pH of the reaction mixture between 6 and 7. 300 parts of salt are then added, the mixture is cooled to room temperature and the precipitate so obtained is filered off and dried.

The blue product when added on to cotton and subjected to an alkaline after treatment gives bright greenish-blue shades of good fastness to washing.

The di-4-p-aminobenzoylamino copper phthalocyanine tetrasulfonic acid used in the above example may be obtained as follows:

18.5 parts of copper(4-amino)phthalocyanine sulfonic acid (contained as described in Example 4) are dissolved in 400 parts of water and the solution is neutralised to pH 7 by the addition of sodium hydroxide. The neutral solution is cooled to 5 to 10° C. and a solution of 22.5 parts of p-nitrobenzoyl chloride in 50 parts of acetone is added. The mixture is stirred and kept at pH 7 by addition of 40% sodium hydroxide solution until no more acid is liberated. Sodium chloride is then added and the precipitate is filtered off, washed with brine and suspended in 100 parts of water. 240 parts of 30% aqueous sodium hydrogen sulfide are added, and the mixture is stirred at a temperature of 95 to 100° C. for 4 hours. Sodium chloride is then added and the mixture is cooled, filtered and the filter cake is washed with brine until free from alkali and from sulfide ions and dried.

*Example 44*

If the di-4-p-aminobenzoylamine copper phthalocyanine tetra-3-sulfonic acid used in Example 43 is replaced by 24.7 parts of di-4-m-aminophenylsulfonylamino copper phthalocyanine tetra-3-sulfonic acid, a similar dyestuff is obtained.

Di-4-m-aminophenylsulfonylamine copper phthalocyanine tetra-3-sulfonic acid may be obtained by the procedure described in the final paragraph of Example 43, except that the p-nitrobenzoyl chloride is replaced by 26.5 parts of m-nitrobenzene sulfonyl chloride.

*Example 45*

If the copper phthalocyanine-3-(N-4'-amino-3'-methoxyphenyl)sulfonamide sulfonic acid used in Example 24 is replaced by 9.2 parts of 4-p-aminophenylmercapto copper phthalocyanine tri-4-sulfonic acid, the dyestuff obtained gives greener and duller shades.

4-p-aminophenylmercapto copper phthalocyanine tri-4- sulfonic acid may be obtained by the method described in Example 40 for the preparation of 4-p-aminobenzoyl nickel phthalocyanine tri-4-sulfonic acid, except that the 4-p-nitobenzoylphthalic acid and anhydrous nickel phthalocyanine are replaced by the equivalent quantities of 4-p-nitrophenyl mercapto phthalic anhydride and anhydrous cupric chloride.

*Example 46*

If the copper phthalocyanine-3-(N-4'-amino-3'-methoxyphenyl)sulfonamide sulfonic acid used in Example 24 is replaced by 9.6 parts of 4-p-aminophenylsulfamyl copper phthalocyanine-tri-4-sulfonic acid, a similar dyestuff is obtained.

4-p-aminophenylsulfamyl copper phthalocyanine tri-4-sulfonic acid may be obtained as follows:

448 parts of copper phthalocyaninetetra-4-sulfonic acid are converted to the sulfonchloride as described in Example 3. The filter cake is suspended in 10,000 parts of ice-water, and any residual acidity is neutralised to pH 7 by means of sodium carbonate, 26 parts of p-nitroaniline and 13 parts of sodium bicarbonate are added and the mixture is stirred at 25° C. for 16 hours. The mixture is then heated to 70° C. and stirred, adding 10% aqueous sodium hydroxide solution to keep the pH at 7 until no more acid is liberated.

Sodium chloride is added and the precipitate is filtered off, washed with brine and added to 2500 parts of 30% aqueous sodium hydrogen sulfide. The mixture is stirred at 95 to 100° C. for 8 hours, then sodium chloride is added and the mixture is cooled and filtered and the filter cake is washed with brine until free from alkali and from sulphide ions, and is then dried.

*Example 47*

If the copper phthalocyanine-3-(N-4'-amino-3'-methoxyphenyl)sulfonamide sulfonic acid used in Example 24 is replaced by 9.6 parts of a p-aminophenylmercaptomethyl copper phthalocyanine-3-sulfonic acid obtained as described below, a similar dyestuff is obtained.

The p-aminophenylmercaptomethyl copper phthalocyanine-3-sulfonic acid used in this example may be obtained as follows:

75 parts of copper phthalocyanine are dissolved in a mixture of 220 parts of chlorosulfonic acid and 250 parts of 100% sulfuric acid and 50 parts of paraformaldehyde are added. The mixture is heated to 85° C. and stirred for 16 hours, then cooled to 40° C. and 320 parts of chlorosulfonic acid are added. The mixture is heated to 120° C. and stirred for 3½ hours, then cooled and drowned into a mixture of ice and water.

The precipitate is filtered off, washed and dried. It consists of a mixture of chloromethylated copper phthalocyanine sulfonic acids containing 1.6 chloromethyl groups and 2.3 sulfonic acid groups for each atom of copper.

20.9 parts of this chloromethylated copper phthalocyanine sulfonic acid are dissolved in 200 parts of water and sodium hydroxide solution is added until a solution of pH 7 is obtained. The solution is evaporated to dryness and the solid residue is dried thoroughly in vacuo at 50° C. The sodium chloromethyl copper phthalocyanine sulfonate so obtained is ball-milled in 200 parts of β-ethoxyethanol and a solution of 25 parts of p-nitrothiophenol and 3.7 parts of sodium in 125 parts of β-ethoxyethanol is added. The mixture is stirred at 100° C. for 2 hours and then at 130° C. for 4 hours. The mixture is then cooled, diluted with water and filtered. The product on the filter is washed with dilute sodium hydroxide solution until free from p-nitrothiophenol, then with water until free from alkali. It is then dissolved in water and reduced with sodium hydrogen sulfide.

*Example 48*

If the copper phthalocyanine-3-(N-4'-amino-3'-methoxyphenyl)sulfonamide sulfonic acid used in Example 24 is replaced by 9.6 parts of the p-aminophenoxymethyl copper phthalocyanine-3-sulfonic acid obtained as described below a similar dyestuff is obtained.

The p-aminophenoxymethyl copper phthalocyanine-3-sulfonic acid used may be obtained by the method described in Example 47 for the preparation of a p-aminophenylmercaptomethyl copper phthalocyanine-3-sulfonic acid, but substituting a mixture of 25 parts of potassium p-nitrophenate and 4 parts of p-nitrophenol for the p-nitrothiophenol and sodium.

*Example 49*

If the copper phthalocyanine -3-(N-4'-amino-3'-methoxyphenyl)sulfonamide sulfonic acid used in Example 24 is replaced by 9.1 parts of a p-amino-phenylaminomethylcopper phthalocyanine sulfonic acid obtained as described below, a similar dyestuff is obtained.

The p-aminophenylaminomethyl copper phthalocyanine sulfonic acid used may be obtained by the method described in Example 47 for the preparation of a p-aminophenylmercaptomethyl copper phthalocyanine sulfonic acid, but substituting 22 parts of p-nitroaniline for the p-nitrothiophenol.

*Example 50*

If the copper phthalocyanine - 3-(N-4'-amino-3'-methoxyphenyl)sulfonamide sulfonic acid used in Example 24 is replaced by 8.7 parts of 2-aminoethylaminomethyl copper phthalocyanine sulfonic acid obtained as described below a similar dyestuff is obtained.

The 2-aminoethylaminomethyl copper phthalocyanine sulfonic acid used may be obtained as follows:

A mixture of 30 parts of chloromethylated copper phthalocyanine sulfonic acid obtained as described in Example 47 and 100 parts of monoacetyl ethylenediamine is stirred at 100° C. for 6 hours. The mixture is cooled, diluted with 100 parts of ethanol and the precipitate is filtered off and washed with a further 100 parts of ethanol. The filter cake is added to 2000 parts of water containing 20 parts of sodium hydroxide and the solution is refluxed for 2 hours. Concentrated aqueous hydrochloric acid is then added until the phthalocyanine is precipitated. The solid is collected and dried at 50° C.

*Example 51*

A mixture of 62 parts of copper phthalocyanine tetra-4-sulfonic acid and 564 parts of 10% oleum are heated at 80° C. 60 parts of methylolphthalimide are added and the mixture is heated to 95–100° C., stirred for 4½ hours, then drowned into ice and water. Salt is added and the precipitate is filtered off and washed with brine.

The filter cake is dissolved in boiling water, hydrochloric acid is added until the mixture is strongly acid, and the mixture is cooled. The precipitate is filtered off and dried.

23.2 parts of the product are dissolved in 500 parts of water and the solution is cooled to below 5° C. in an atmosphere of nitrogen. A solution of 7.5 parts of p-nitrobenzoyl chloride in 50 parts of acetone is added and the mixture is stirred for 30 minutes maintaining the pH at 7.0 to 7.5 by addition of 2N-aqueous sodium hydroxide solution. The solution of p-nitrobenzoylaminomethyl copper phthalocyanine sulfonic acid so obtained is then reduced to the amino compound using sodium hydrogen sulfide. The amino compound is salted out, the precipitate is washed free from sulfide ions with 20% sodium chloride solution. It is redissolved in 500 parts of water and condensed with 11.7 parts of 2-p-chlorophenylthio-4, 6-dichloro-s-triazine as described in Example 24 to give a similar dyestuff.

*Example 52*

If, in the process described in Example 24, 6.7 parts of copper phthalocyanine - N - β-aminoethylsulfonamide sulfonic acid are used in place of the copper phthalocyanine - 3-N-(4'-amino-3'-methoxyphenyl)sulmonamide sulfonic acid and 2.85 parts of 2-p-methylphenylthio-4,6- dichloro-s-triazine, are used in place of the 2-p-chlorophenylthio-4,6-dichloro-s-triazine, a similar dyestuff is obtained.

The copper phthalocyanine - N - β-aminoethylsulfonamide sulfonic acid used in this example may be obtained by the method described in Example 12.

*Example 53*

If the copper phthalocyanine - 3-N-(4'-amino-3'-methoxyphenyl)sulfonamide sulfonic acid used in Example 24 is replaced by 7.3 parts of copper phthalocyanine-N-p-(aminomethyl)phenyl sulfonamide sulfonic acid (obtained as described below) and the 2-p-chlorophenylthio-4,6-dichloro-s-triazine is replaced by 2.85 parts of 2-p-methylphenylthio-4,6-dichloro-s-triazine, a similar dyestuff is obtained.

The copper phthalocyanine-N-p-(aminomethyl)phenyl sulfonamide sulfonic acid used in the above example may be obtained as follows:

A mixture of 28.8 parts of copper phthalocyanine and 135 parts of chlorosulfonic acid is stirred at 140° C. for 3 hours, then cooled and poured into ice and water. The precipitate is filtered off and washed with 200 parts of 1% aqueous hydrochloric acid at 0° C.

The filter cake is stirred with 150 parts of ice and 150 parts of water and the pH is adjusted to 5 by addition of 8% aqueous sodium hydroxide solution. 18 parts of p-amino-N-benzylacetamide are added and the mixture is heated to 40° C. and stirred at 40 to 45° C. for 3 hours, keeping the pH at from 5 to 5.5 by addition of sodium hydroxide solution. The mixture is then made weakly alkaline by adding sodium hydroxide solution and heated for 1 hour at 80° C. 100 parts of concentrated hydrochloric acid solution are then added and the mixture is heated at 70 to 80° C. for 3 hours. The mixture is then cooled, filtered and the product on the filter is washed with 200 parts of 1% aqueous hydrochloric acid and dried.

*Example 54*

If the copper phthalocyanine - 3-N-(4'-amino-3'-methoxyphenylsulfonamide-sulfonic acid used in Example 24 is replaced by 6.9 parts of 2-p-aminobenzylsulfonyl copper phthalocyanine tri-3-sulfonic acid, a similar dyestuff is obtained.

3-p-aminobenzylsulfonyl copper phthalocyanine tri-3-sulfonic acid may be obtained as follows:

A mixture of 11.5 parts of copper phthalocyanine and 480 parts of chlorosulfonic acid is stirred at 138° C. for 4 hours, then the solution is cooled and poured into ice and water. The precipitate is filtered off and washed with 200 parts of 1% aqueous hydrochloric acid at 0° C.

The filter cake is added during 1 hour to a mixture of 145 parts of sodium bisulfite and 36.8 parts of sodium hydroxide in 500 parts of water, keeping the pH at from 7 to 7.5 by adding 10% aqueous sodium carbonate solution as necessary.

9.3 parts of sodium bicarbonate are added and the mixture is stirred at 20° C. for 18 hours. Sufficient aqueous caustic soda solution is then added to give a pH of 10.5 and the mixture is stirred for 1 hour, then salt is added and the precipitate is filtered off.

The filter cake is dissolved in 200 parts of dimethyl formamide and 20 parts of p-nitrobenzyl bromide are added.

The mixture is stirred at 50° C. for 16 hours and the bulk of the dimethylformamide is distilled off under reduced pressure. The residue is dissolved in 200 parts of water, the unreacted p-nitrobenzyl bromide is filtered off and the solution of sodium p-nitrobenzylsulfonyl copper phthalocyanine tri-sulfonate so obtained is reduced to the amine compound by treatment with sodium hydrogen sulfide.

*Example 55*

If the di-4-p-aminobenzoylamino copper phthalocyanine used in Example 43 is replaced by 23.4 parts of di-4-(aminobenzylmercapto)copper phthalocyanine tetrasulfonic acid a similar but greener dyestuff is obtained.

The di-4-p-aminobenzoylamino copper phthalocyanine tetrasulfonic acid used in this example may be obtained as follows:

A mixture of 38.4 parts of 4-nitrophthalimide, 29.4 parts of phthalimide, 120 parts of urea, 20 parts of anhydrous cupric chloride, 1 part of ammonium molybdate, 2 parts of boric acid and 300 parts of α-chloronaphthalene are stirred at 140–145° C. for 3 hours.

The crude product so obtained is washed free from α-chloronaphthalene, suspended in water and reduced by treatment with sodium hydrogen sulfide to give di(4'-amino)-copper phthalocyanine.

300 parts of an aqueous paste of the latter is added to 300 parts of 36% aqueous hydrochloric acid and 50 parts of 10% aqueous sodium nitrite solution are added. The mixture is stirred for a short time and the solution obtained is added to a solution of 20 parts of potassium ethyl xanthate in 100 parts parts of water at 50–60° C. At the same time, sufficient sodium carbonate is added to keep the solution alkaline. The suspension of xanthate ester so obtained is cooled to 40° C. filtered and the product on the filter is washed with water and boiled for 1 hour with 8 times its weight of 33% aqueous sodium hydroxide solution. The mixture is poured into 300 parts of water and the solution obtained is acidified. The precipitate formed is filtered off, washed with water and dried.

20 parts of the product so obtained are suspended in 600 parts of water, 20 parts of 10 N-sodium hydroxide solution are added, followed by 40 parts of sodium sulfide mono hydrate, the mixture is heated to 80° C. until the di-4-mercapto-phthalocyanine is in solution, then cooled to 50°. A solution of 20 parts of p-nitrobenzyl chloride in 50 parts of acetone is added and the mixture is then heated at 90° C. for 30 minutes to complete the reaction. The product is filtered off, washed with water and alcohol and dried. The di-4-p-nitrobenzylmercaptocopper phthalocyanine so obtained is reduced to the amino compound by ball-milling for 16 hours with sodium hydrogen sulfide solution and the dry amino compound is then sulfonated by treatment in 20% oleum to give the tetrasulfonic acid.

*Example 56*

75 parts of copper phthalocyanine are added at 20–30° C. during 2 hours to a stirred mixture of 106 parts of chlorsulfonic acid and 74 parts of 100% sulfuric acid. Then 75 parts of paraformaldehyde are added. The mixture is heated to 85° C. and stirred for 16 hours, then cooled to 40°. 68 parts of chlorsulfonic acid are added and the mixture is heated to 120° C. and stirred for 3½ hours.

The mixture is drowned in ice-water and the solid is filtered off, washed well with 2 N hydrochloric acid and drained. The solid is suspended in 1000 parts of 20% potassium acetate solution for 8 hours and then filtered off. Finally it is stirred with 1000 parts of 2 N hydrochloric acid and then filtered off, washed well with 2 N hydrochloric acid and dried. Analysis shows that the product is a mixture having the averaged constitution: $CuPc(SO_3H)_{1.7}(CH_2Cl)_{2.3}$.

10 parts of the above chlormethylated copper phthalocyanine sulfonic acid are stirred with 80 parts of water and N sodium hydroxide solution is added until the pH is 7. Then a solution of 17.3 parts of the sodium salt of p-phenylene diamine sulfonic acid in 100 parts of water is added. The mixture is stirred at 60° C. for 36 hours, cooled and 25 parts of concentrated hydrochloric acid are added. The precipitate is collected, well washed with 2 N hydrochloric acid and dried at 50° C. Analysis shows that this product contains approximately 1.6 p-phenylene diamine sulfonic acid residues.

The above product is stirred with 80 parts of water and N sodium hydroxide is added until the pH of the solution is 6.5. The solution is cooled to 5° C. and then a solution of 5 parts of cyanuric chloride in 150 parts of acetone is added. At intervals the pH is adjusted to 6.5 by the addition of N sodium hydroxide solution. When the reaction is finished, 200 parts of salt are added and the precipitated dyestuff is filtered off and dried.

The product obtained is similar in properties to that described in Example 1 but gives dyeings of slightly greener shade.

*Example 57*

The process described in Example 56 is repeated except that 4.7 parts of 2:4-dichloro-6-methoxy-s-triazine are used in place of cyanuric chloride.

A similar product is obtained.

*Example 58*

The process described in Example 56 is repeated except that 6.7 parts of 2:4-dichloro-6-phenoxy-s-triazine are used in place of cyanuric chloride.

A similar product is obtained.

*Example 59*

The process described in Example 18 is repeated, except that 5.5 parts of 2-p-methylphenoxy-4,6-dichloro-s triazine are used in place of the 2-p-methylphenylthio-4,6-dichloro-s-triazine.

A similar product is obtained.

*Example 60*

The process described in Example 18 is repeated, except that 5.96 parts of 2-p-chlorophenoxy-4,6-dichloro-s-triazine are used in place of the 2-p-methylphenylthio-4,6-dichloro-s-triazine.

A similar product is obtained.

We claim:
1. Phthalocyanine dyestuffs of the formula:

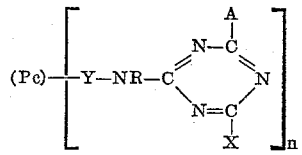

wherein (Pc) stands for the phthalocyanine radical selected from the group consisting of copper phthalocyanine, copper sulfophthalocyanine, nickel sulfophthalocyanine, and nickle phthalocyanine, —Y— is a bridging group selected from the class consisting of (a) a direct link
(b) —SO$_2$NHCH$_2$CH$_2$—
(c) —CH$_2$NHCH$_2$CH$_2$— and
(d) sulfo-substitued mono- and di-cyclic arylene, carboxy-substituted phenylene, lower alkoxy-substituted phenylene, chloro-substituted phenylene, and mono- and di-cyclic arylene hydrocarbons linked to the phthalocyanine group through a radical selected from the group consisting of: —O—, —NHCO—, NHSO$_2$—, —CH$_2$S—, —CH$_2$O—, —CH$_2$NH—, —CH$_2$NHCO—, —SO$_2$NH—, —CO—, —SO$_2$—, —S—, and —SO$_2$NHCH$_2$CH$_2$NH—, and R is selected from the group consisting of hydrogen, lower alkyl, and β-hydroxyethyl; and the system Pc—Y— contains at least one sulfonic acid group;

A is selected from the group consisting of chlorine, bromine, lower alkoxy, phenoxy, sulfophenylthio, methylphenylthio, nitrophenylthio, and chlorophenylthio;

X is selected from the group consisting of chlorine and bromine, and n stands for one of the numbers 1 and 2.

2. A chemical compound of the formula:

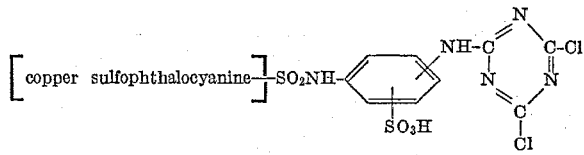

3.

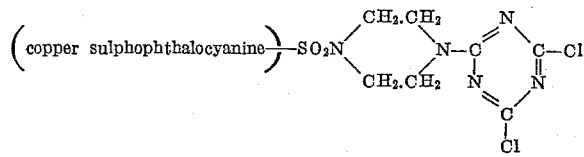

References Cited in the file of this patent
UNITED STATES PATENTS

| 3,063,780 | Rosch et al. | Nov. 13, 1962 |

FOREIGN PATENTS

| 200,689 | Austria | Nov. 25, 1958 |
| 805,562 | Great Britain | Dec. 10, 1958 |
| 836,647 | Great Britain | June 8, 1960 |
| 2630/57 | South Africa | Aug. 13, 1957 |